United States Patent
Lee et al.

(10) Patent No.: US 12,487,748 B2
(45) Date of Patent: Dec. 2, 2025

(54) STORAGE DEVICE AND HOST DEVICE

(71) Applicant: Samsung Electronics Co., Ltd., Suwon-si (KR)

(72) Inventors: Seung Han Lee, Suwon-si (KR); Kyung Keun Lee, Suwon-si (KR); Gyeong Taek Lee, Suwon-si (KR); Bum Jun Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 83 days.

(21) Appl. No.: 18/605,333

(22) Filed: Mar. 14, 2024

(65) Prior Publication Data

US 2025/0077082 A1   Mar. 6, 2025

(30) Foreign Application Priority Data

Sep. 6, 2023   (KR) .......................... 10-2023-0118343

(51) Int. Cl.
*G06F 3/06*   (2006.01)

(52) U.S. Cl.
CPC .......... *G06F 3/0613* (2013.01); *G06F 3/0659* (2013.01); *G06F 3/0679* (2013.01)

(58) Field of Classification Search
CPC .... G06F 3/0613; G06F 3/0659; G06F 3/0679; G06F 3/0604; G06F 3/0653; G06F 3/0656; G06F 3/0658; G06F 3/0683; G06F 8/654; G06F 8/65; G06F 13/4282
See application file for complete search history.

(56) References Cited

U.S. PATENT DOCUMENTS

| | | | |
|---|---|---|---|
| 8,949,565 B2 | 2/2015 | Khosravi et al. | |
| 9,146,855 B2 | 9/2015 | Lambert et al. | |
| 9,223,563 B2 | 12/2015 | Stenfort et al. | |
| 9,477,295 B2 | 10/2016 | Jreji et al. | |
| 10,120,823 B2 | 11/2018 | Waidhofer et al. | |
| 10,452,386 B1 * | 10/2019 | Kulchytskyy | G06F 8/654 |
| 10,762,033 B2 * | 9/2020 | Cao | G06F 15/177 |
| 10,860,505 B1 * | 12/2020 | Mutnury | H04L 25/03885 |
| 11,106,393 B2 | 8/2021 | Frolikov | |
| 11,520,483 B2 | 12/2022 | Kang et al. | |

(Continued)

FOREIGN PATENT DOCUMENTS

CN   114840456 A   8/2022

OTHER PUBLICATIONS

Search Report for European Patent Application No. 24163108.4, dated Aug. 13, 2024.

*Primary Examiner* — Hiep T Nguyen
(74) *Attorney, Agent, or Firm* — Harness, Dickey & Pierce, P.L.C.

(57) ABSTRACT

A storage device comprises a first non-volatile memory, a storage controller configured to receive a memory command for writing data in the first non-volatile memory or reading the data from the first non-volatile memory from a processor of a host device through a first channel, a microcontroller configured to receive a command related to a firmware update executed in the storage device from a baseboard management controller (BMC) of the host device through a second channel different from the first channel, and a second non-volatile memory configured to receive and store firmware data from the BMC of the host device.

20 Claims, 14 Drawing Sheets

(56) References Cited

U.S. PATENT DOCUMENTS

| | | | | |
|---|---|---|---|---|
| 2013/0179872 A1* | 7/2013 | Kuzmack | ............ | G06F 9/45533 |
| | | | | 717/173 |
| 2017/0315954 A1* | 11/2017 | Chung | ................ | G06F 13/4022 |
| 2018/0314511 A1* | 11/2018 | Butcher | ................... | G06F 8/654 |
| 2024/0256673 A1* | 8/2024 | Khatri | ................... | G06F 21/575 |

* cited by examiner

STORAGE DEVICE AND HOST DEVICE

CROSS-REFERENCE TO RELATED APPLICATION

This application claims priority from Korean Patent Application No. 10-2023-0118343 filed on Sep. 6, 2023 in the Korean Intellectual Property Office and all the benefits accruing therefrom under 35 U.S.C. 119, the contents of which in its entirety are herein incorporated by reference.

BACKGROUND

Technical Field

The present disclosure relates to a storage device and a host device.

Description of the Related Art

Storage devices such as a Solid State Drive (SSD), Non-Volatile Memory Express (NVMe), Embedded Multi-Media Card (eMMC), and Universal Flash Memory (UFS) are widely used.

The storage device may operate under the management of a host device. Since the host device is connected to the storage device through an interface, an operating system of the host device can control an operation of the storage device through an in-band channel.

Meanwhile, a Baseboard Management Controller (BMC) is being introduced to the host device for the management of components that constitute the host device. Such a BMC may perform communication with the storage device through an out-of-band channel independently of the operating system of the host device.

Firmware (hereinafter, referred to as FW) activation is an operation of updating the currently operating firmware in the storage device to new firmware through host commands (e.g., FW download command and FW commit command). Several studies are ongoing to improve efficiency of firmware update in this storage device.

BRIEF SUMMARY

An object of various example embodiments is to provide a storage device and a host device, in which efficiency is improved.

The objects of the various example embodiments are not limited to those mentioned above, and additional objects of the present disclosure will be clearly understood by those skilled in the art from the following description of the present disclosure.

According to some example embodiments, a storage device comprises a first non-volatile memory, a storage controller configured to receive a memory command for writing data in the first non-volatile memory or reading the data from the first non-volatile memory from a processor of a host device through a first channel, a microcontroller configured to receive a command related to a firmware update executed in the storage device from a baseboard management controller (BMC) of the host device through a second channel different from the first channel, and a second non-volatile memory configured to receive and store firmware data from the BMC of the host device.

According to some example embodiments, there is provided a host device comprising a processor configured to transmit a memory command, for writing data in a non-volatile memory or reading the data from the non-volatile memory, through a first channel to a storage controller of a storage device including the non-volatile memory, and a BMC configured to transmit a command to a microcontroller of the storage device, wherein the command is related to a firmware update executed in the storage device, through a second channel different from the first channel.

According to some example embodiments, a storage device comprises a first non-volatile memory, a storage controller configured to receive a memory command for writing data in the first non-volatile memory or reading the data from the first non-volatile memory from a processor of a host device through a first channel, and a microcontroller configured to receive a command related to firmware update executed in the storage device from a BMC of the host device through a second channel different from the first channel, wherein the microcontroller receives the command related to firmware update through the second channel during a time the storage controller is receiving the memory command from the processor of the host device through the first channel.

According to some example embodiments, there is provided a storage device comprises a first non-volatile memory, a storage controller configured to receive a memory command for writing data in the non-volatile memory or reading the data from the non-volatile memory from a processor of a host device through a first channel, and a microcontroller configured to receive a command related to firmware update executed in the storage device from a BMC of the host device through a second channel different from the first channel, wherein the microcontroller receives the command related to firmware update through the second channel in a state that the storage controller is powered off.

BRIEF DESCRIPTION OF THE DRAWINGS

The above and other aspects and features will become more apparent upon consideration of the description of various example embodiments herein, with reference to the attached drawings, in which.

DETAILED DESCRIPTION OF THE DISCLOSURE

Hereinafter, example embodiments will be described with reference to the accompanying drawings.

Figure 1:
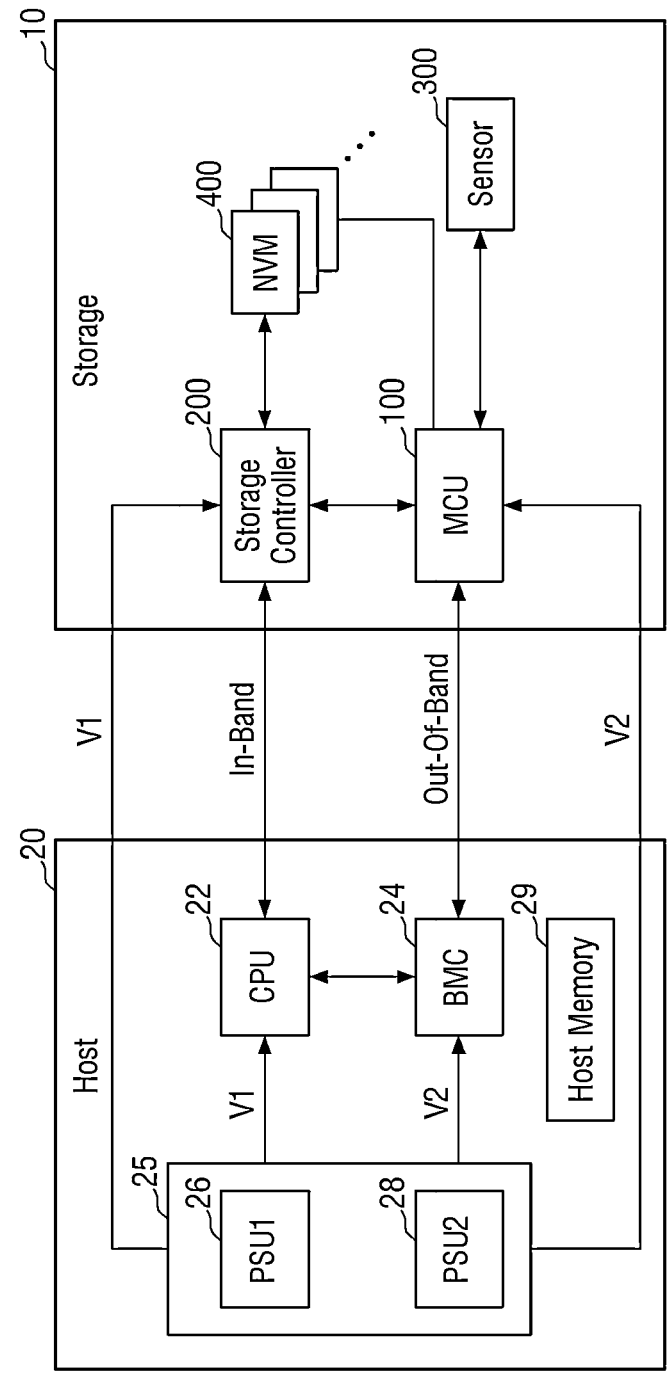
FIG. 1 is a view illustrating a storage system according to some example embodiments.

FIG. 1 is a view illustrating an example embodiment of a storage system according to some embodiments.

Referring to FIG. 1, a storage system 1 may include a storage device 10 and a host device 20.

The host device 20 may include a processor 22 and a baseboard management controller (BMC) 24.

The processor 22 may include, for example, a central processing unit (CPU), but the example embodiments are not limited thereto.

The processor 22 of the host device 20 may be connected to the storage device 10 through an in-band channel. In some example embodiments, the processor 22 of the host device 20 may be connected to a storage controller 200 of the storage device 10 through the in-band channel.

An operating system of the host device 20 may be executed by the processor 22 to transmit a command to the storage controller 200 through the in-band channel, thereby controlling an operation of the storage device 10.

In some example embodiments, the host device 20 may control the operation of the storage device 10 by transmitting a memory command to the storage device 10 through the in-band channel. In some example embodiments, the memory command may include a read command for reading data stored in the non-volatile memory 400 of the storage device 10, a write command indicating data storage in the non-volatile memory 400 of the storage device 10, and an erase command indicating deletion of the data stored in the non-volatile memory 400 of the storage device 10, but the example embodiments are not limited thereto.

The BMC 24 may manage various components mounted on a base board constituting the host device 20. The BMC 24 may perform communication with the processor 22, and may have a wireless communication channel separate from the processor 22. The BMC 24 may manage various components mounted on the base board independently of the processor 22.

The host device 20 may include a power supply unit 25.

In some example embodiments, the power supply unit 25 may include a first power supply unit (PSU) 26 and a second power supply unit 28. In some example embodiments, the second power supply unit 28 may have the same configuration as that of the first power supply unit 26, and may be disposed against when the first power supply unit 26 is unable to operate due to failure. Therefore, the description of the first power supply unit 26 described below may be also applied to the second power supply unit 28.

The first power supply unit 26 may receive a power source from the outside, and may generate a first voltage V1 and a second voltage V2. In some example embodiments, magnitudes of the first voltage V1 and the second voltage V2 may be different from each other. In some example embodiments, the magnitude of the first voltage V1 may be greater than that of the second voltage V2. In some example embodiments, the first voltage V1 may be 12V and the second voltage V2 may be 3.3V, but the example embodiments are not limited thereto.

The first power supply unit 26 may provide the first voltage V1 to the processor 22 by using a first power rail, and provide the second voltage V2 to the BMC 24 by using a separate second power rail distinguished from the first power rail.

Since the processor 22 and the BMC 24 receive the operating voltages V1 and V2 through the independent power rails as described above, the processor 22 and the BMC may operate independently of each other. For example, since the second voltage V2 is supplied to the BMC 24 through a separate power rail from the power supply unit 25 even though the processor 22 is in a power-off state as the first voltage V1 is not supplied thereto, the BMC 24 may perform a management operation.

In some example embodiments, the first voltage V1 may be a main voltage of the host device 20 and the second voltage V2 may be an auxiliary voltage, but the example embodiments are not limited thereto.

The BMC 24 of the host device 20 may be connected to the storage device 10 through an out-of-band channel. In some example embodiments, the BMC 24 of the host device 20 may be connected to the microcontroller 100 of the storage device 10 through the out-of-band channel.

The BMC 24 may transmit a command to the microcontroller 100 of the storage device 10 through the out-of-band channel by using an independent control system implemented separately from the operating system of the host device 20.

For example, the BMC 24 may transmit a command for requesting product information of the storage device 10 or state information of the storage device 10 to the microcontroller 100 of the storage device 10 through the out-of-band channel. In addition, the microcontroller 100 of the storage device 10 may provide the product information of the storage device 10 or the state information of the storage device 10 to the BMC 24 through the out-of-band channel in response to the request. The BMC 24 may perform a management operation for controlling the operation of the storage device 10 based on the received information.

For example, the BMC 24 may transmit a command related to firmware update executed in the storage device 10 to the microcontroller 100 of the storage device 10 through the out-of-band channel. The microcontroller 100 of the storage device 10 may perform a firmware update after receiving the firmware data through the out-of-band channel. In some example embodiments, the command related to the firmware update may include, for example, a firmware (FW) download command, a firmware commit command, etc., but the example embodiments are not limited thereto.

In some example embodiments, the in-band channel and the out-of-band channel may be different channels independent of each other. For example, the in-band channel and the out-of-band channel may be channels for performing communication by using their respective protocols, which may be different from each other. In some example embodiments, the in-band channel may perform communication by using any one of a Universal Flash Storage (UFS) protocol, an embedded Multi-Media Card (eMMC) protocol and a Non-Volatile Memory express (NVMe) protocol.

For example, when the storage device 10 is an SSD, the in-band channel may be a channel for performing communication by using the non-volatile memory express (MVMe) protocol. For example, when the storage device 10 is an embedded memory or an external memory, the in-band channel may be a channel for performing communication by using the universal flash storage (UFS) protocol or the embedded multi-media card (eMMC) protocol. The storage device 10 and the host device 20 may generate a packet according to a standard protocol employed therein and transmit the generated packet through the in-band channel.

The out-of-band channel may perform communication by using any one of an Inter Integrated Circuit (I2C) protocol and a System Management Module Bus (SMBus) protocol, but the example embodiments are not limited thereto.

The host device 20 can include a host memory 29. The host memory 29 may store data provided to the storage device 10. In some example embodiments, the host memory 29 may store firmware data (e.g., firmware image) to be used for firmware update of the storage device 10. In some example embodiments, the host memory 29 may store write data to be stored in the non-volatile memory 400 of the storage device 10.

The storage device 10 may include storage media for storing data in response to a request from the host device 20. For example, the storage device 10 may include a solid state drive (SSD), an embedded memory, a detachable external memory, etc., but the example embodiments are not limited thereto.

For example, when the non-volatile memory 400 of the storage device 10 includes a flash memory, the flash memory may include a 2D NAND memory array or a 3D (or vertical) NAND (VNAND) memory array. For example, the storage device 10 may include various types of non-volatile memories. For example, the storage device 10 may be implemented by applying a Magnetic Random Access Memory (MRAM), a Spin-Transfer Torque MRAM, a Conductive Bridging RAM (CBRAM), a Ferroelectric RAM (FeRAM), a Phase RAM (PRAM), a Resistive RAM and various other types of memories.

The storage device 10 may include a microcontroller 100, a storage controller 200, a sensor 300 and a non-volatile memory 400. The microcontroller 100 and the storage controller 200 may perform communication with each other.

The microcontroller 100 may receive sensing information of the sensor 300 from the sensor 300. The microcontroller 100 may provide such sensing information to the BMC 24 through the out-of-band channel.

The sensor 300 may include, for example, a plurality of sensors, each of which may sense one or more parameters of the storage device 10. For example, the sensor 300 may include a voltage sensor for sensing a voltage of the non-volatile memory 400, an external voltage sensor for sensing a voltage provided from the outside of the storage device 10, a temperature sensor for sensing a temperature of the storage device 10, a humidity sensor for sensing humidity around the storage device 10, etc., but the example embodiments are not limited thereto.

In some example embodiments, the microcontroller 100 may operate by receiving the second voltage V2 from the power supply unit 25 of the host device 20. For example, some of a plurality of connection terminals of the microcontroller 100 may be connected to the power supply unit 25 of the host device 20 to receive the second voltage V2 from the power supply unit 25. Therefore, the microcontroller 100 may operate independently from the storage controller 200. For example, during a time the storage controller 200 is in a power-off state because no voltage is supplied to the storage controller 200, the microcontroller 100 may operate using the second voltage V2 to perform communication with the BMC 24 by using the out-of-band channel.

Hereinafter, a configuration of the microcontroller 100 according to some example embodiments will be described with reference to FIG. 2.

Figure 2:
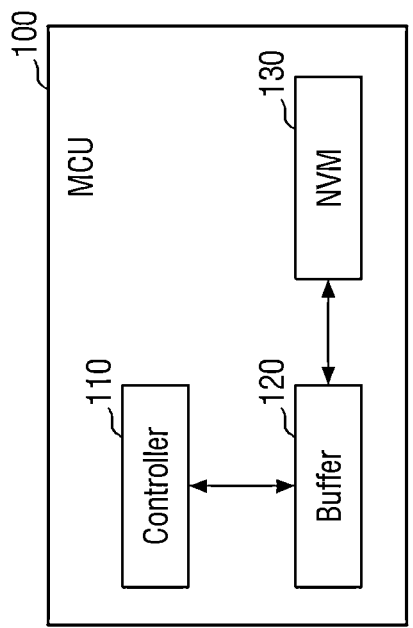
FIG. 2 is a view illustrating an example embodiment of a configuration of a microcontroller of FIG. 1.

FIG. 2 is a view illustrating an example configuration of a microcontroller of FIG. 1.

Referring to FIGS. 1 and 2, the microcontroller 100 may include a controller 110, a buffer memory 120 and a non-volatile memory 130.

The controller 110 may perform communication with the BMC 24 through the out-of-band channel and control the operation of the microcontroller 100.

The buffer memory 120 may temporarily store data received through the out-of-band channel or temporarily store data to be transmitted through the out-of-band channel. In some example embodiments, the buffer memory 120 may include, for example, a Dynamic Random Access Memory (DRAM), a Static Random Access Memory (SRAM), etc., but the example embodiments are not limited thereto.

The non-volatile memory 130 may store data to be stored for a long time. In some example embodiments, the non-volatile memory 130 may store vital product data (VPD) for the storage device 10. In this case, the VPD may include basic information such as a serial number and a model of the storage device 10, but the example embodiments are not limited thereto. The VPD of the storage device 10 may be stored in the non-volatile memory 130, for example, when the storage device 10 is released from a factory.

In some example embodiments, the non-volatile memory 130 may store sensing information provided from the sensor 300. The sensing information and the VPD may be provided to the BMC 24 in accordance with a request of the BMC 24, and the BMC 24 may manage the storage device 10 based on the provided information.

In some example embodiments, the non-volatile memory 130 may store firmware data (e.g., firmware images) that are executed in the storage device 10. The firmware data may be updated by communication using the out-of-band channel between the microcontroller 100 and the BMC 24. A detailed description of the firmware data will be described below.

Although FIG. 2 shows that the microcontroller 100 includes the non-volatile memory 130, the example embodiments are not limited thereto. In some example embodiments, the non-volatile memory 130 may be disposed outside the microcontroller 100.

In some example embodiments, the non-volatile memory 130 may be disposed in the storage device 10, and may be distinguished from the non-volatile memory 400. In some example embodiments, the non-volatile memory 130 may be implemented, for example, as a Ferroelectric Random Access Memory (FRAM), but the example embodiments are not limited thereto.

Referring back to FIG. 1, the storage controller 200 may operate by receiving the first voltage V1 from the power supply unit 25 of the host device 20. Hereinafter, the example embodiments of storage controller 200 will be described in more detail with reference to FIG. 3.

Figure 3:
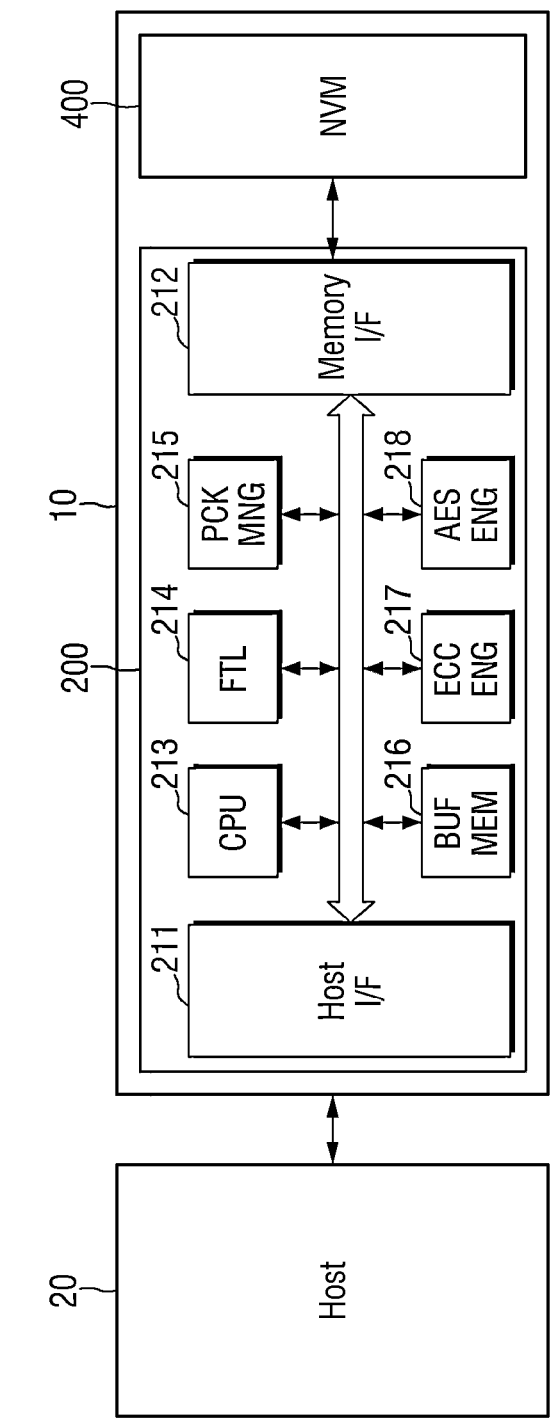
FIG. 3 is a view illustrating an example embodiment of a configuration of a storage controller of FIG. 1.

FIG. 3 is a view illustrating an example configuration of the storage controller of FIG. 1.

Referring to FIG. 3, the storage controller 200 may include a host interface 211, a memory interface 212 and a central processing unit (CPU) 213. The storage controller 210 may further include a flash translation layer (FTL) 214, a packet manager 215, a buffer memory 216, an error correction code (ECC) engine 217 and an advanced encryption standard (AES) engine 218.

The storage controller 210 may further include a working memory in which the flash translation layer (FTL) 214 is loaded, and the CPU 213 may control data write and read operations for the non-volatile memory 400 by executing the flash translation layer 214.

The host interface 211 may transmit and receive packets to and from the host device 20 through the in-band channel.

The packets transmitted from the host device 20 to the host interface 211 may include a command or data to be written in the non-volatile memory 400, and the packets transmitted from the host interface 211 to the host 20 may include a response to the command or data read from the non-volatile memory 400.

The memory interface 212 may transmit the data to be written in the non-volatile memory 400 to the non-volatile memory 400, or may receive the data read from the non-volatile memory 400. Such a memory interface 212 may be implemented to comply with standard protocols such as Toggle or Open NAND Flash Interface (ONFI).

The flash translation layer 214 may perform various functions such as address mapping, wear-leveling and garbage collection. The address mapping operation is an operation of changing a logical address received from the host device 20 to a physical address used to actually store data in the non-volatile memory 400. The wear-leveling is a technique for preventing excessive degradation of a specific block by allowing blocks in the non-volatile memory 400 to be used uniformly, and may be implemented, for example, through firmware technology for balancing erase counts of physical blocks. The garbage collection is a technique attempting to maximize available capacity in the non-volatile memory 400 by copying valid data of a block to a new block and then erasing the existing block.

The packet manager 215 may generate a packet according to a protocol of an in-band channel of an interface negotiated with the host device 20, or may parse various kinds of information from the packet received from the host device 20.

The buffer memory 216 may temporarily store data to be written in the non-volatile memory 400 or data to be read from the non-volatile memory 400. The buffer memory 216 may be provided in the storage controller 200, but may be disposed outside the storage controller 200.

The ECC engine 217 may perform error detection and correction functions for the data read from the non-volatile memory 400. In more detail, the ECC engine 217 may generate parity bits for data to be written in the non-volatile memory 400, and the generated parity bits may be stored in the non-volatile memory 400 together with the write data. When reading the data from the non-volatile memory 400, the ECC engine 217 may correct an error of the read data by using the parity bits read from the non-volatile memory 400 together with the read data, and then may output the error-corrected read data.

The AES engine 218 may perform at least one of an encryption operation or a decryption operation for the data input to the storage controller 210 by using a symmetric-key algorithm.

Figure 4:
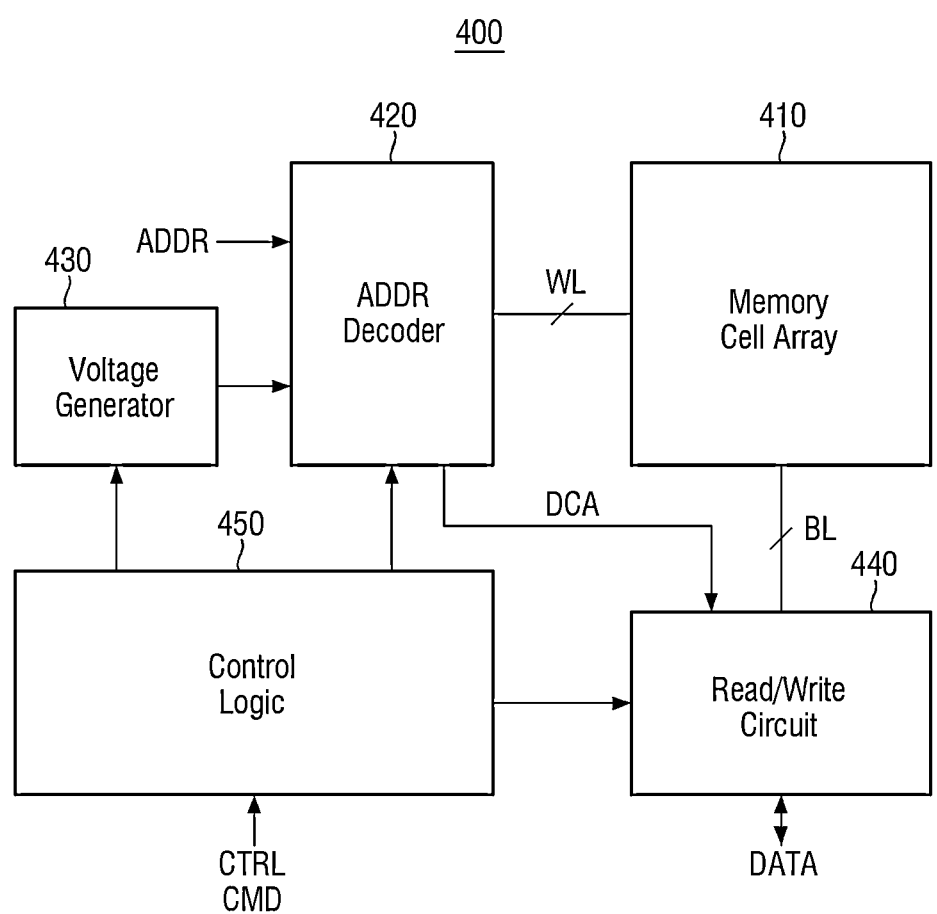
FIG. 4 is a block diagram illustrating an example embodiment of a non-volatile memory of FIG. 1.

FIG. 4 is a block diagram illustrating the non-volatile memory of FIG. 1.

Referring to FIG. 4, the non-volatile memory 400 may include a memory cell array 410, an address decoder 420, a voltage generator 430, a read write circuit 440 and a control logic circuit 450.

The memory cell array 410 may be connected to the address decoder 420 through word lines WL. The memory cell array 410 may be connected to the read write circuit 440 through bit lines BL. The memory cell array 410 may include a plurality of memory cells. For example, memory cells arranged in a row direction may be connected to the same word line WL, and memory cells arranged in a column direction may be connected to the same bit line BL.

The address decoder 420 may be connected to the memory cell array 410 through the word line WL. The address decoder 420 may operate in response to the control of the control logic circuit 450. The address decoder 420 may receive an address ADDR from the storage controller 200. The address decoder 420 receives a voltage required for an operation such as a program operation and a read operation from the voltage generator 430.

The address decoder 420 may decode a row address of the received address ADDR. The address decoder 420 may select the word line WL by using the decoded row address. A decoded column address DCA may be provided to the read write circuit 440. For example, the address decoder 420 may include a row decoder, a column decoder, and an address buffer.

The voltage generator 430 may generate a voltage required for an access operation under the control of the control logic circuit 450. For example, the voltage generator 430 may generate a program voltage and a program verification voltage, which are required to perform the program operation. For example, the voltage generator 430 may generate read voltages required to perform the read operation, and may generate an erase voltage and an erase verification voltage, which are required to perform an erase operation. In addition, the voltage generator 430 may provide a voltage required to perform each operation to the address decoder 420.

The read write circuit 440 may be connected to the memory cell array 410 through the bit line BL. The read write circuit 440 may exchange data DATA with the storage controller 200. The read write circuit 440 may operate in response to the control of the control logic circuit 450. The read write circuit 440 may receive the decoded column address DCA from the address decoder 420. The read write circuit 440 may select the bit line BL by using the decoded column address DCA.

For example, the read write circuit 440 may program the received data DATA in the memory cell array 410. The read write circuit 440 may read the data from the memory cell array 410 and provide the read data to the outside (e.g., the storage controller 200). For example, the read write circuit 440 may include elements such as a sense amplifier, a write driver, a column selection circuit and a page buffer. That is, the read write circuit 440 may buffer the data DATA received from the storage controller 200 in the page buffer, and may program the buffered data DATA to the memory cell array 410.

The control logic circuit 450 may be connected to the address decoder 420, the voltage generator 430 and the read write circuit 440. The control logic circuit 450 may control the operation of the non-volatile memory 400. The control logic circuit 450 may operate in response to a control signal CRTL and a command CMD (e.g., a write command and a read command, etc.), which are provided from the storage controller 200.

Figure 5:
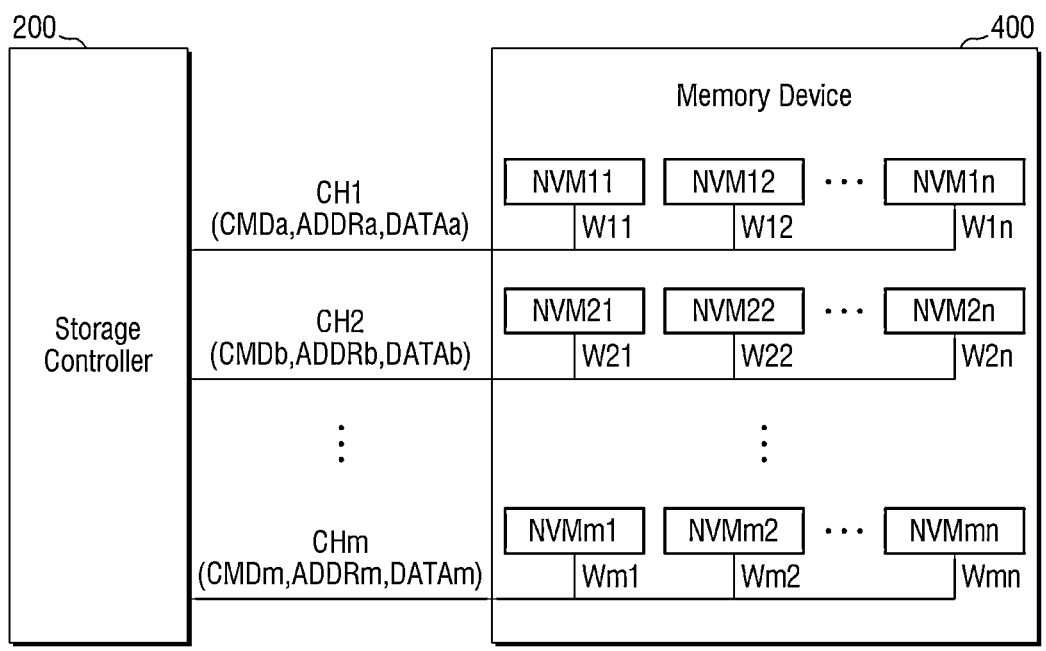
FIG. 5 is a block diagram illustrating an example embodiment of a storage controller and a non-volatile memory of FIG. 1.

FIG. 5 is a block diagram illustrating a storage controller and a non-volatile memory of FIG. 1.

Referring to FIG. 5, the storage device 10 may include a storage controller 200 and a non-volatile memory 400. The storage device 10 may support a plurality of channels CH1 to CHm, and the storage controller 200 and the non-volatile memory 400 may be connected through the plurality of channels CH1 to CHm. For example, the storage device 10 may be implemented as a storage device such as a solid state drive (SSD).

The non-volatile memory 400 may include a plurality of non-volatile memory devices NVM11 to NVMmn. Each of the non-volatile memory devices NVM11 to NVMmn may be connected to one of the plurality of channels CH1 to CHm through a corresponding way. For example, the non-volatile memory devices NVM11 to NVM1n may be connected to a first channel CH1 through ways W11 to W1n, and the non-volatile memory devices NVM21 to NVM2n may be connected to a second channel CH2 through ways W21 to W2n. In an example embodiment, each of the non-volatile memory devices NVM11 to NVMmn may be implemented in any memory unit capable of operating in accordance with an individual command from the storage controller 200. For example, each of the non-volatile memory devices NVM11 to NVMmn may be implemented as a chip or a die, but the example embodiments are not limited thereto.

The storage controller 200 may transmit and receive signals to and from the non-volatile memory 400 through the plurality of channels CH1 to CHm. For example, the storage controller 200 may transmit commands CMDa to CMDm, addresses ADDRa to ADDRm and data DATAa to DATAm to the non-volatile memory 400 or receive the data DATAa to DATAm from the non-volatile memory 400.

The storage controller 200 may select one of the non-volatile memory devices connected to a corresponding channel through each channel, and may transmit and receive signals to and from the selected non-volatile memory device. For example, the storage controller 200 may select the non-volatile memory device NVM11 from the non-volatile memory devices NVM11 to NVM1n connected to the first channel CH1. The storage controller 200 may transmit the command CMDa, the address ADDRa and the data DATAa to the selected non-volatile memory device NVM11 through the first channel CH1 or receive the data DATAa from the selected non-volatile memory device NVM11.

The storage controller 200 may transmit and receive signals to and from the non-volatile memory 400 in parallel through different channels. For example, the storage controller 200 may transmit the command CMDb to the non-volatile memory 400 through the second channel CH2 while transmitting the command CMDa to the non-volatile memory 400 through the first channel CH1. For example, the storage controller 200 may receive the data DATAb from the non-volatile memory 400 through the second channel CH2 while receiving the data DATAa from the non-volatile memory 400 through the first channel CH1.

The storage controller 200 may control an overall operation of the non-volatile memory 400. The storage controller 200 may transmit a signal to the channels CH1 to CHm to control each of the non-volatile memory devices NVM11 to NVMmn connected to the channels CH1 to CHm. For example, the storage controller 200 may control a selected one of the non-volatile memory devices NVM11 to NVM1n by transmitting the command CMDa and the address ADDRa to the first channel CH1.

Each of the non-volatile memory devices NVM11 to NVMmn may operate under the control of the storage controller 200. For example, the non-volatile memory device NVM11 may program the data DATAa in accordance with the command CMDa, the address ADDRa and the data DATAa, which are provided to the first channel CH1. For example, the non-volatile memory device NVM21 may read the data DATAb in accordance with the command CMDb and the address ADDRb, which are provided to the second channel CH2, and may transmit the read data to the storage controller 200.

Although FIG. 5 shows that the non-volatile memory 400 performs communication with the storage controller 200 through 'm' number of channels and includes 'n' number of non-volatile memory devices corresponding to each channel, various modifications may be made in the number of the channels and the number of the non-volatile memory devices connected to one channel.

Figure 6:
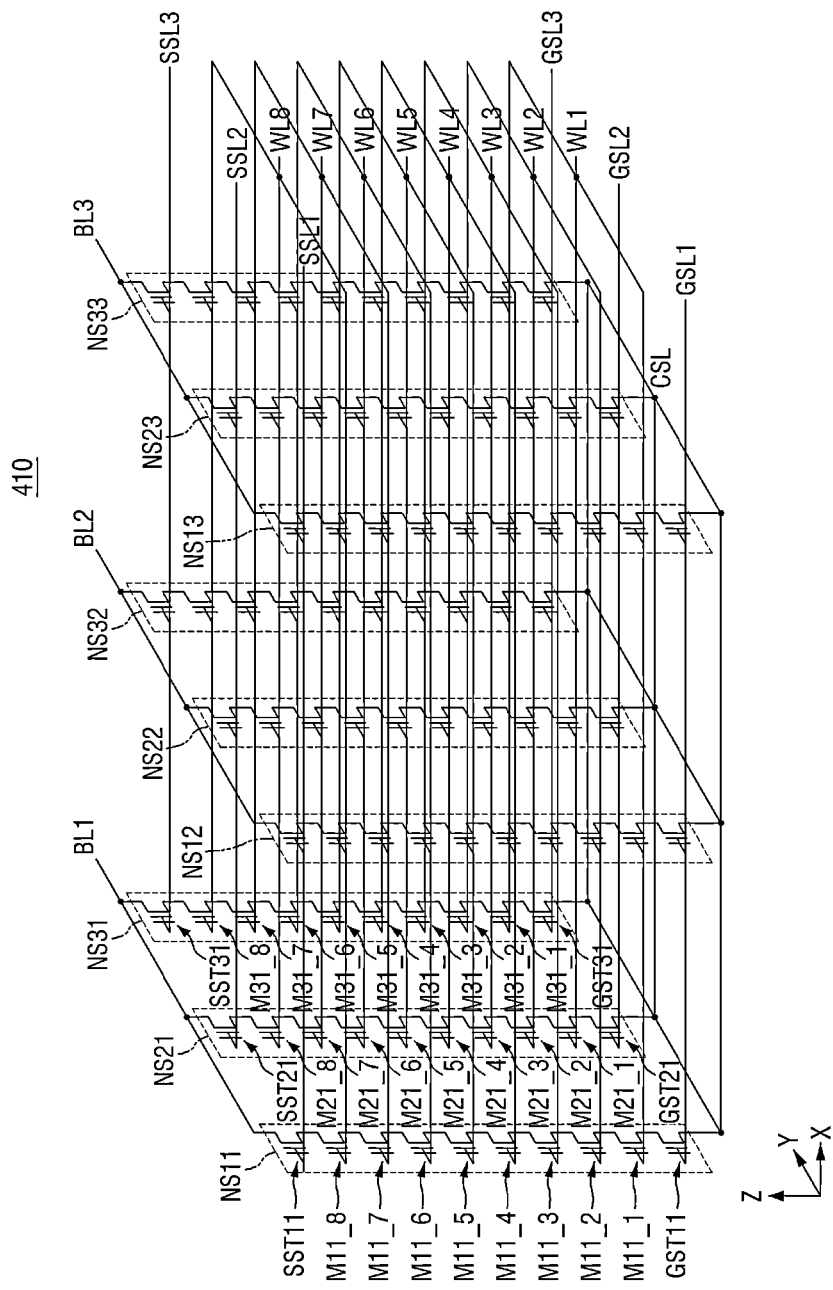
FIG. 6 is a circuit diagram illustrating an example embodiment of a memory cell array of FIG. 4.

FIG. 6 is an example circuit view illustrating the memory cell array of FIG. 4.

Referring to FIG. 6, a plurality of cell strings NS11, NS21, NS31, NS12, NS22, NS32, NS13, NS23 and NS33 may be disposed on a substrate in a first direction x and a second direction y. The plurality of cell strings NS11, NS21, NS31, NS12, NS2, NS32, NS13, NS23 and NS33 may have a shape extended in a third direction z. The plurality of cell strings NS11, NS21, NS31, NS12, NS22, NS32, NS13, NS23 and NS33 may be commonly connected to a common source line CSL formed on the substrate or in the substrate.

The common source line CSL is shown as being connected to the lowermost end of the plurality of cell strings NS11, NS21, NS31, NS12, NS22, NS32, NS13, NS23 and NS33 in the third direction z. However, it is sufficient that the common source line CSL is electrically connected to the lowermost end of the plurality of cell strings NS11, NS21, NS31, NS12, NS22, NS32, NS13, NS23 and NS33 in the third direction z and is not limited to the case that it is physically positioned at the lowermost end of the plurality of cell strings NS11, NS21, NS31, NS12, NS22, NS32, NS13, NS23 and NS33. In addition, the plurality of cell strings NS11, NS21, NS31, NS12, NS22, NS32, NS13, NS23 and NS33 are shown as being disposed in a 3×3 array, but the arrangement and number of the plurality of cell strings disposed in the memory cell array 410 are not limited thereto.

Several cell strings NS11, NS12 and NS13 may be connected to a first ground select line GSL1. Some cell strings NS21, NS22 and NS23 may be connected to a second ground select line GSL2. Some cell strings NS31, NS32 and NS33 may be connected to a third ground select line GSL3.

Also, some cell strings NS11, NS12 and NS13 may be connected to a first string select line SSL1. Some cell strings NS21, NS22 and NS23 may be connected to a second string select line SSL2. Some cell strings NS31, NS32 and NS33 may be connected to a third string select line SSL3.

Each of the plurality of cell strings NS11, NS21, NS31, NS12, NS22, NS32, NS13, NS23 and NS33 may include a string select transistor SST connected to each of the string select lines. In addition, each of the plurality of cell strings NS11, NS21, NS31, NS12, NS22, NS32, NS13, NS23 and NS33 may include a ground select transistor GST connected to each of the ground select lines.

One end of each of the ground select transistors of the plurality of cell strings NS11, NS21, NS31, NS12, NS22, NS32, NS13, NS23 and NS33 may be connected to the common source line CSL. In addition, each of the plurality of cell strings NS11, NS21, NS31, NS12, NS22, NS32, NS13, NS23 and NS33 may be sequentially stacked in the third direction z between the ground select transistor and the string select transistor. Although not shown in the drawing, each of the plurality of cell strings NS11, NS21, NS31, NS12, NS22, NS32, NS13, NS23 and NS33 may include dummy cells between the ground select transistor and the string select transistor. In addition, the number of the string select transistors included in each string is not limited to the shown example.

For example, the cell string NS11 may include a ground select transistor GST11 disposed at the lowermost end in the third direction z, a plurality of memory cells M11_1 to M11_8 sequentially stacked in the third direction z on the ground select transistor GST11, and a string select transistor SST11 stacked in the third direction z on the uppermost memory cell M11_8. The cell string NS21 may include a ground select transistor GST21 disposed at the lowermost end in the third direction z, a plurality of memory cells M21_1 to M21_8 sequentially stacked in the third direction z on the ground select transistor GST21 and a string select transistor SST21 stacked in the third direction z on the uppermost memory cell M21_8. The cell string NS31 may include a ground select transistor GST31 disposed at the lowermost end in the third direction z, a plurality of memory cells M31_1 to M31_8 sequentially stacked in the third direction z on the ground select transistor GST31, and a string select transistor SST31 stacked in the third direction z on the uppermost memory cell M31_8. The other strings may be configured similarly to the cell strings NS11, NS21 and NS31.

The memory cells positioned at the same height in the third direction z from the substrate or the ground select transistor may be electrically connected in common to each word line. For example, the memory cells having a height at which memory cells M11_1, M21_1 and M31_1 are formed may be connected to a first word line WL1. In addition, the memory cells of a height at which the memory cells M11_2, M1_2 and M31_2 are formed may be connected to a second word line WL2. Hereinafter, since the arrangement and structure of the memory cells connected to the third to eighth word lines WL3 to WL8 are similar to those of the memory cells connected to the first word line WL1 and the second word line WL2, their description will be omitted.

One end of each string select transistor of the plurality of cell strings NS11, NS21, NS31, NS12, NS22, NS32, NS13, NS23 and NS33 may be connected to the bit lines BL1, BL2 and BL3. For example, the string select transistors ST11, SST21 and SST31 may be connected to the bit line BL1 extended in the second direction y. The other string select transistors connected to the bit lines BL2 and BL3 are similar to those connected to the bit line BL1 and thus their description will be omitted.

The memory cells corresponding to one string (or ground) select line and one word line may form one page. A write operation and a read operation may be performed in units of each page. Each memory cell of each page may store two or more bits. The bits written in the memory cells of each page may form logical pages.

The memory cell array 410 may be provided as a three-dimensional memory array. The three-dimensional memory array may be monolithically formed at one or more physical levels of arrays of memory cells having a substrate (not shown) and an active area disposed above a circuit associated with an operation of the memory cells. The circuit associated with the operation of the memory cells may be positioned in or above the substrate. "Monolithically formed" means that layers of each level of the three-dimensional array may be deposited directly on lower-level layers of the three-dimensional array.

Hereinafter, a firmware update operation of a storage system according to some example embodiments will be described with reference to FIGS. 7 to 12.

Figure 7:
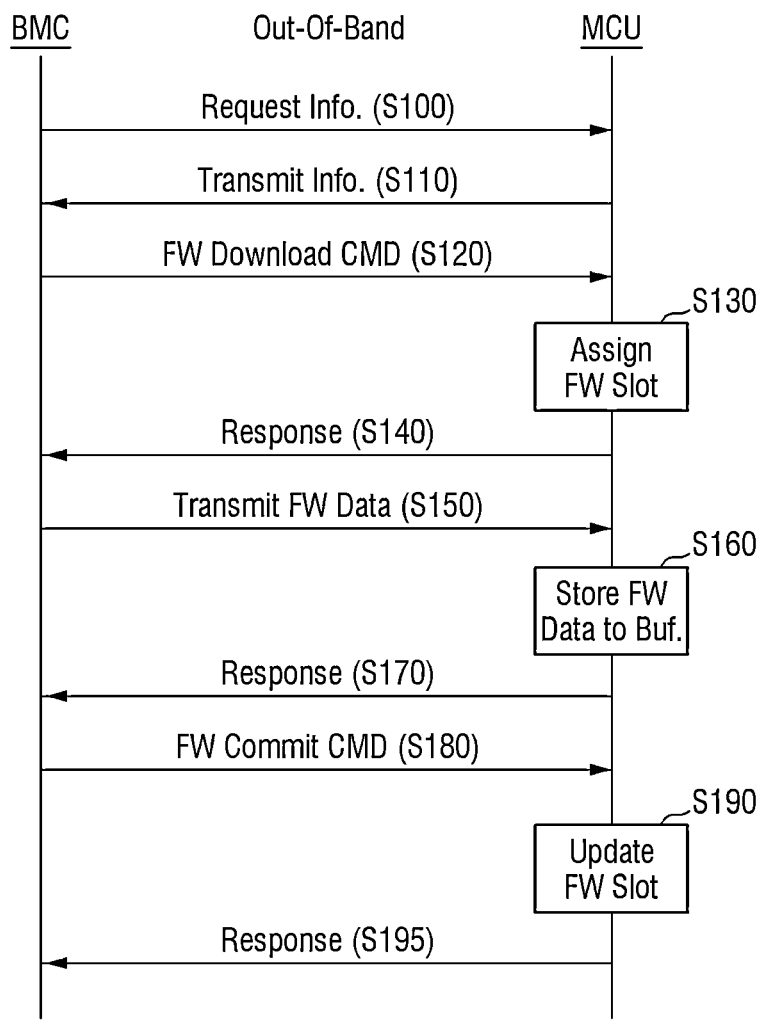
FIG. 7 is a flow chart illustrating an example embodiment of a firmware update operation of a storage system according to some embodiments.

FIG. 7 is a flow chart illustrating a firmware update operation of a storage system according to some example embodiments. FIGS. 8 to 12 are views illustrating the firmware update operation of FIG. 7.

Referring to FIGS. 1 and 7, the BMC 24 requests the microcontroller 100 of information on the storage device 10 through the out-of-band channel (S100). In response to the request, the microcontroller 100 transmits the information on the storage device 10 to the BMC 24 (S110).

In some example embodiments, the information on the storage device 10 may be Vital Product Date (VPD) for the storage device 10. Also, in some example embodiments, the information on the storage device 10 may be sensing data for the storage device 10.

Figure 8:
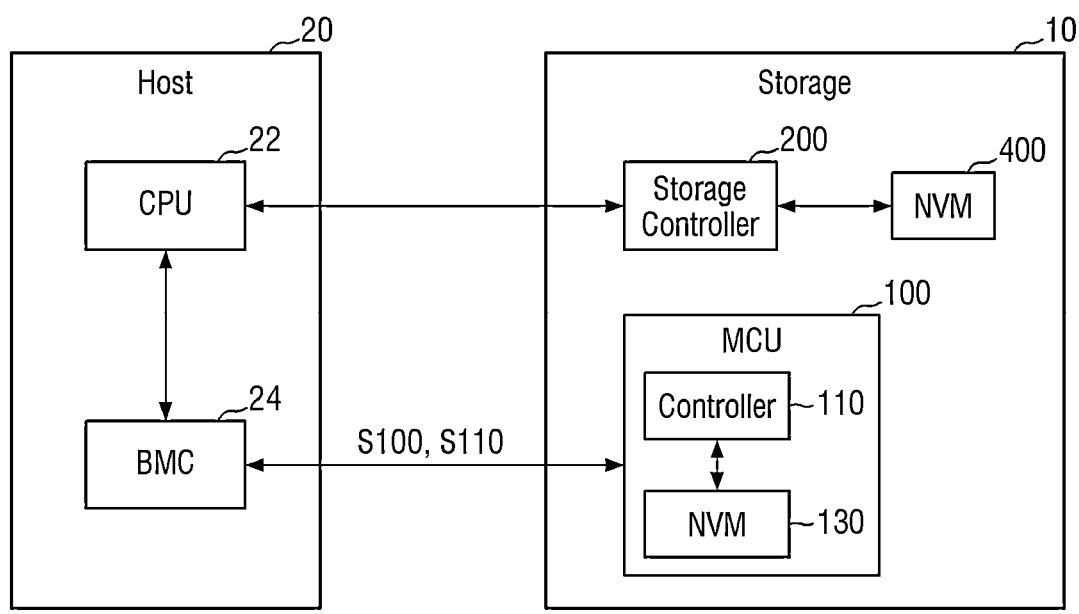
FIGS. 8 to 12 are views illustrating an example embodiment of the firmware update operation of FIG. 7.

For example, referring to FIG. 8, the controller 110 of the microcontroller 100 may transmit the VPD or the sensing data, which is stored in the non-volatile memory 130, to the BMC 24.

Although FIG. 7 shows an example in which an information exchange operation between the BMC 24 and the microcontroller 100 is performed before the firmware update process, the example embodiments are not limited thereto. The information exchange operation between the BMC 24 and the microcontroller 100 may be performed during the firmware update procedure, or may be performed after the firmware update.

Next, referring to FIGS. 1 and 7, the BMC 24 transmits a firmware download command to the microcontroller 100 through the out-of-band channel (S120).

Figure 9:
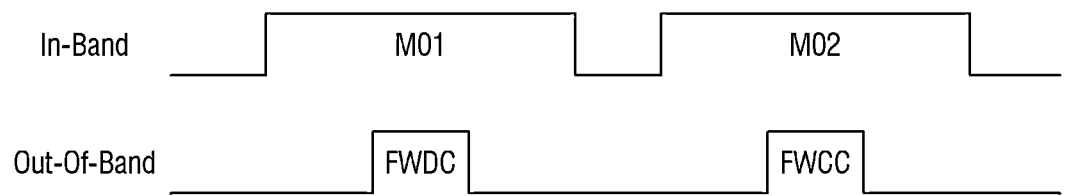

As described above, the BMC 24 operates independently of the processor 22 of the host device 20. Therefore, as shown in FIG. 9, during a time the processor 22 transmits a command MO1 related to a memory operation to the storage controller 200 through the in-band channel, the BMC 24 may transmit a firmware download command FWDC to the microcontroller 100 through the out-of-band channel. That is, an interval for transmitting the command MO1 related to the memory operation to the storage controller 200 by the processor 22 through the in-band channel and an interval for transmitting the firmware download command FWDC to the microcontroller 100 by the processor 22 through the out-of-band channel may overlap each other.

In some example embodiments, the command MO1 related to the memory operation may include a read command for reading the data stored in the non-volatile memory 400 of the storage device 10, a write command indicating data storage in the non-volatile memory 400 of the storage device 10, an erase command indicating deletion of the data stored in the non-volatile memory 400 of the storage device 10 and the like, but the example embodiments are not limited thereto.

Figure 10:
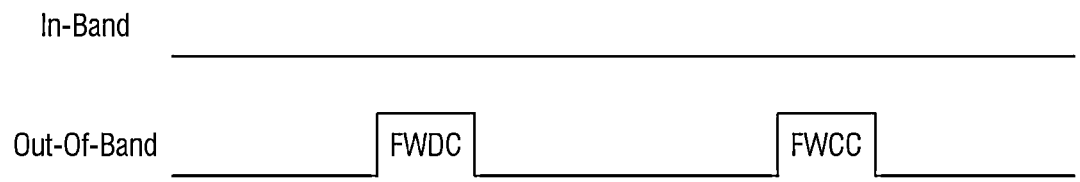

Also, as shown in FIG. 10, during a time communication is not being performed in the in-band channel as the processor 22 is in a power-off state or the storage controller 200 is in a power-off state, the BMC 24 may transmit the firmware download command FWDC to the microcontroller 100 through the out-of-band channel.

Figure 11:
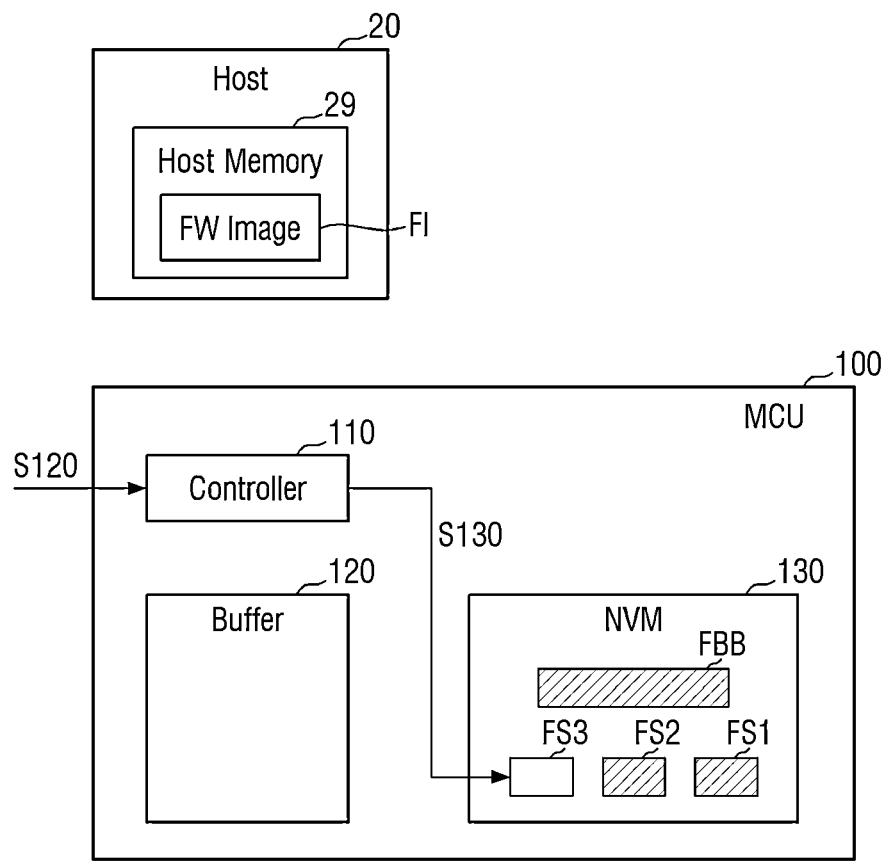

Next, referring to FIGS. 7 and 11, the controller 110 of the microcontroller 100 that receives the firmware download command assigns a firmware slot FS3 for new firmware data to the non-volatile memory 130 (S130).

Different firmware data may be stored in firmware slots FS1 and FS2 of the non-volatile memory 130, and firmware data executed in the current storage device 10 may be stored in a firmware boot block (FBB).

When the firmware slot FS3 is assigned, the controller 110 of the microcontroller 100 responds to the BMC 24 that the firmware slot FS3 has been assigned (S140).

Figure 12:
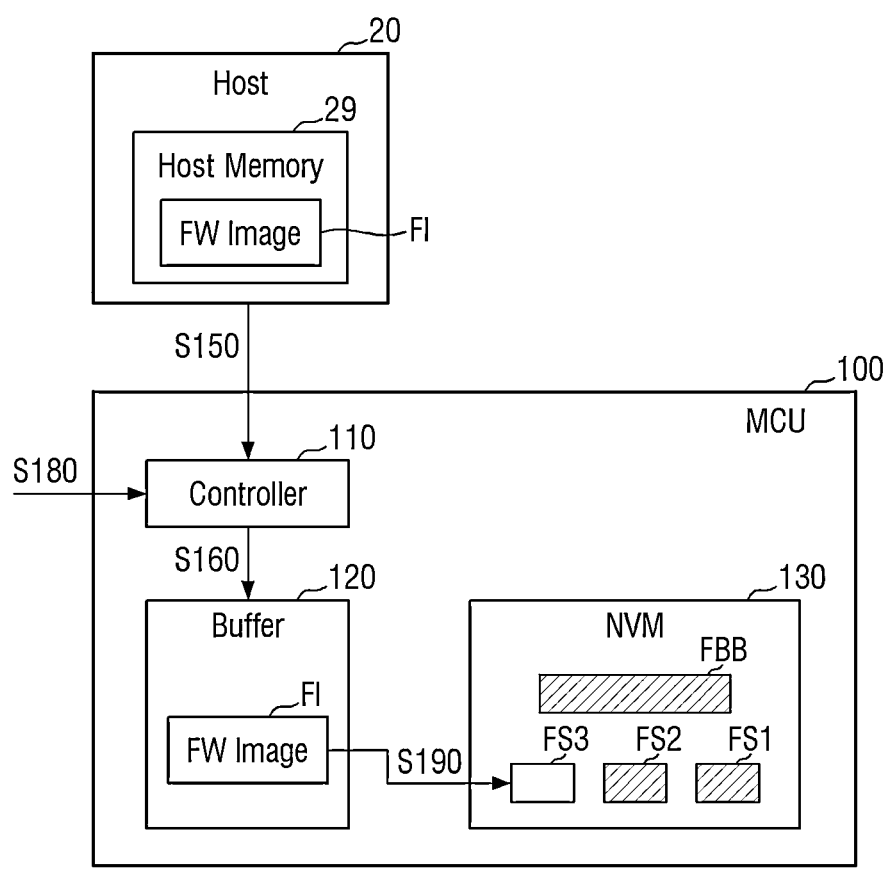

Next, referring to FIGS. 7 and 12, the BMC 24 transmits firmware data to the microcontroller 100 through the out-of-band channel (S150).

In some example embodiments, a firmware image FI, which is firmware data, may be provided from the host memory 29 to the microcontroller 100.

The controller 110 of the microcontroller 100, which receives the firmware data, stores the firmware image FI in the buffer memory 120 (S160). In the present example embodiment, the controller 110 of the microcontroller 100 performs full firmware update. Therefore, the controller 110 of the microcontroller 100 may store the entirety of the firmware image FI, which is provided through the out-of-band channel, in the buffer memory 120.

When the firmware image FI is stored in the buffer memory 120, the controller 110 of the microcontroller 100 responds to the BMC 24 that the firmware image FI has been stored in the buffer memory 120 (S170).

Next, referring to FIGS. 7 and 12, the BMC 24 transmits a firmware commit command to the microcontroller 100 through the out-of-band channel (S180).

In some example embodiments, as shown in FIG. 9, during a time the processor 22 transmits a command MO2 related to the memory operation to the storage controller 200 through the in-band channel, the BMC 24 may transmit the firmware commit command FWCC to the microcontroller 100 through the out-of-band channel. That is, an interval for transmitting the command MO2 related to the memory operation to the storage controller 200 by the processor 22 through the in-band channel and an interval for transmitting the firmware commit command FWCC to the microcontroller 100 by the BMC 24 through the out-of-band channel may overlap each other.

Also, as shown in FIG. 10, during a time communication is not being performed in the in-band channel as the processor 22 is in a power-off state or the storage controller 200 is in a power-off state, the BMC 24 may transmit the firmware commit command FWCC to the microcontroller 100 through the out-of-band channel.

The controller 110 of the microcontroller 100, which receives the firmware commit command, may perform firmware update by storing the firmware image FI stored in the buffer memory 120 in the firmware slot FS3 of the non-volatile memory 130 (S190).

When the firmware image FI is stored in the firmware slot FS3 of the non-volatile memory 130, the controller 110 of the microcontroller 100 responds to the BMC 24 (S195).

When firmware update is performed through the in-band channel, unlike the present example embodiment described above, since many commands for controlling the operation of the non-volatile memory 400 are transmitted via the in-band channel, separate scheduling is required for a firmware update, whereby performance degradation of the storage system may occur.

Since the firmware data (e.g., firmware image) is comprised of several pieces and divided by a plurality of firmware download commands to be downloaded into the storage device, performance degradation of the storage system may be increased in this case.

On the other hand, in the storage system according to various example embodiments, firmware download and firmware commit are performed through the out-of-band channel. Therefore, during a time the in-band channel is continuously used for the memory operation, the out-of-band channel may be used for firmware update, whereby there is no degradation in performance of the storage system due to the firmware update. In addition, since a separate auxiliary voltage is supplied to the microcontroller 100, firmware update may be performed even when the storage device 10 is powered off.

Figure 13:
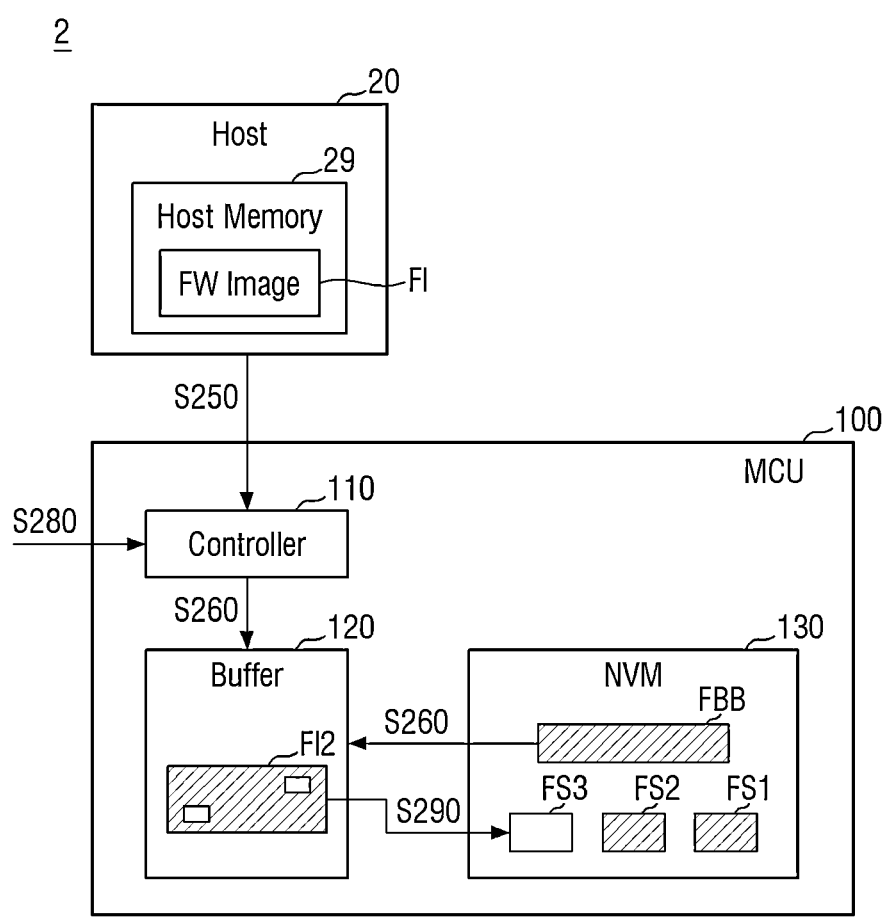
FIG. 13 is a view illustrating a firmware update operation of a storage system according to some other example embodiments.

FIG. 13 is a view illustrating a firmware update operation of the storage system according to other example embodiments. The following description will focus on differences from the above-described example embodiments.

Referring to FIG. 13, the microcontroller 100 in the storage device 10 of the storage system 2 according to the present example embodiment may perform incremental firmware update.

Referring to FIG. 13, when the firmware image FI is provided from the host memory 29 to the microcontroller 100 through the out-of-band channel, the firmware image FI may be provided in the form of a copy on write type (S250).

In some such example embodiments, the controller 110 of the microcontroller 100 may update firmware data (e.g., firmware image) stored in a firmware boot block FBB of the non-volatile memory 130 in units of bits based on the firmware image FI provided from the host memory 29. In addition, the controller 110 of the microcontroller 100 stores the updated firmware image FI2 in the buffer memory 120 (S260).

Subsequent to storing the updated firmware image, the BMC 24 transmits a firmware commit command to the microcontroller 100 through the out-of-band channel (S280), the controller 110 of the microcontroller 100, which receives the firmware commit command, may perform firmware update by storing the firmware image FI2 stored in the buffer memory 120 in the firmware slot FS3 of the non-volatile memory 130 (S290).

Figure 14:
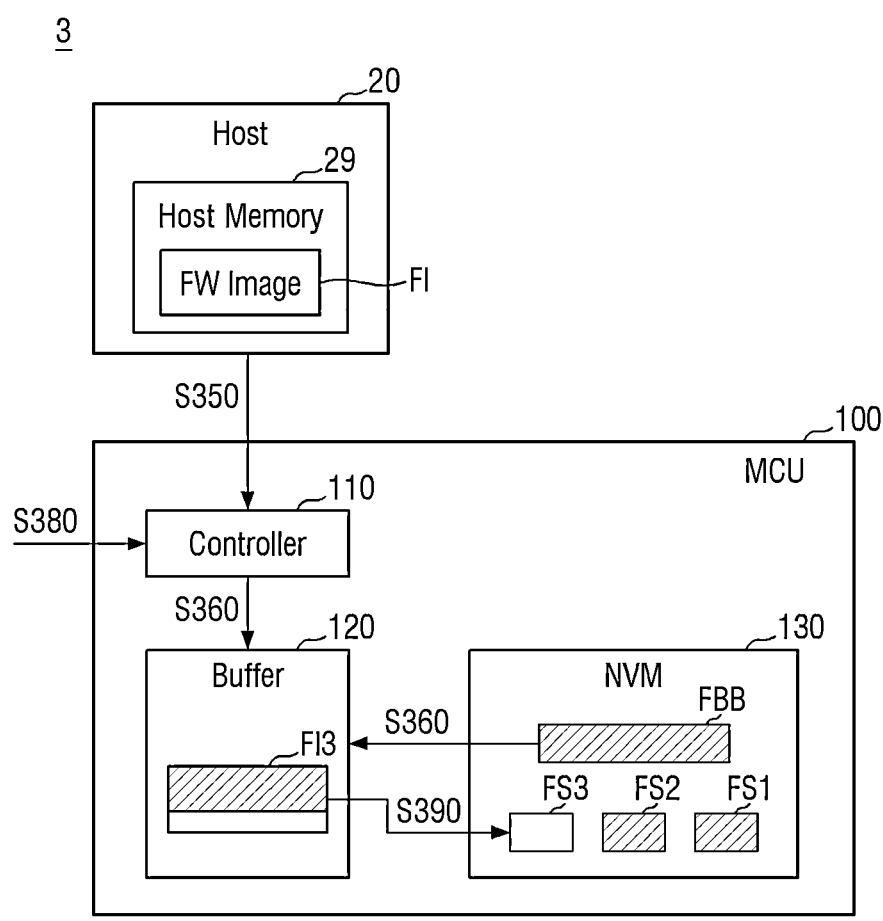
FIG. 14 is a view illustrating a firmware update operation of a storage system according to some other example embodiments.

FIG. 14 is a view illustrating a firmware update operation of a storage system according to some other example embodiments. The following description will focus on differences from the above-described example embodiments.

Referring to FIG. 14, the microcontroller 100 in the storage device 10 of the storage system 3 according to the present example embodiment may perform a partial firmware update.

Referring to FIG. 14, when the firmware image FI is provided from the host memory 29 to the microcontroller 100 through the out-of-band channel, in some example embodiments only a portion of the firmware image FI may be provided (S350).

In some such embodiments, the controller 110 of the microcontroller 100 may update a portion of firmware data (e.g., firmware image) stored in a firmware boot block FBB of the non-volatile memory 130 based on the firmware image FI provided from the host memory 29. In addition, the controller 110 of the microcontroller 100 stores the updated firmware image FI3 in the buffer memory 120 (S360).

Afterwards, when the BMC 24 transmits a firmware commit command to the microcontroller 100 through the out-of-band channel (S380), the controller 110 of the microcontroller 100, which receives the firmware commit command, may perform firmware update by storing the firmware image FI3 stored in the buffer memory 120 in the firmware slot FS3 of the non-volatile memory 130 (S390).

Figure 15:
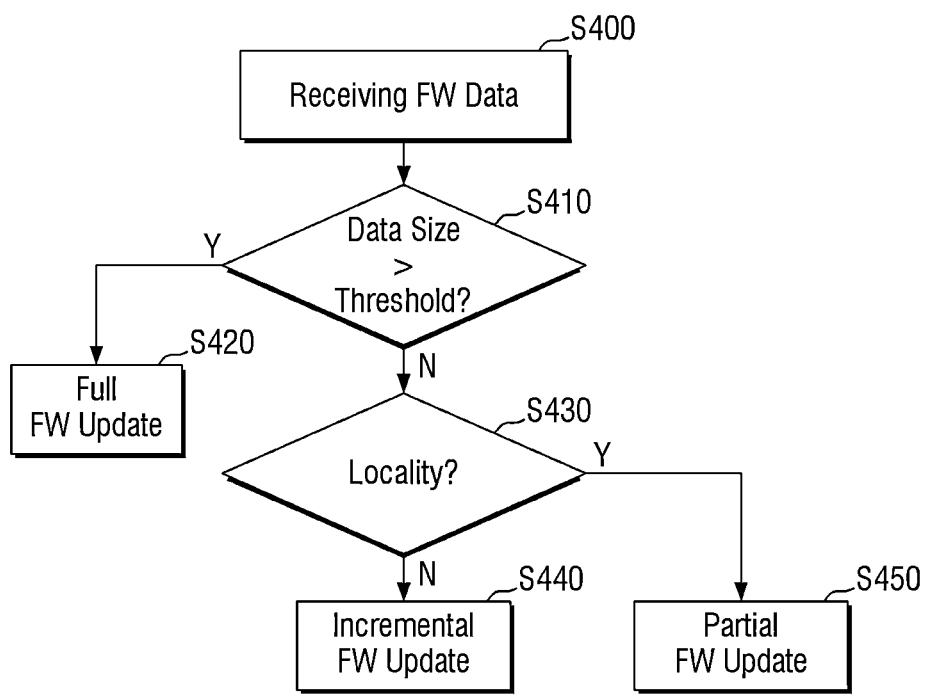
FIG. 15 is a flow chart illustrating a firmware update operation of a storage system according to some other example embodiments.

FIG. 15 is a flow chart illustrating a firmware update operation of a storage system according to various example embodiments.

The microcontroller 100 in the storage device 10 according to the present example embodiment may perform a firmware update by performing the operation shown in FIG. 15.

Referring to FIGS. 1 and 15, the microcontroller 100 receives firmware data to be updated (S400). In addition, the microcontroller 100 determines whether a data size of the firmware data to be updated exceeds a given threshold size (S410).

The microcontroller 100 performs full firmware update as described above when the data size of the firmware data to be updated exceeds the given threshold size (S410-Y).

When the data size of the firmware data to be updated does not exceed a given threshold size (S410—N), the microcontroller 100 determines whether locality exists in the firmware data to be updated (S430).

In this case, the locality means whether an area (for example, an address) of data to be updated is concentrated on a specific area (for example, a specific address).

When the locality exists (S430—Y), since it is efficient to collectively replace the data of the corresponding area, the microcontroller 100 performs the above-described partial firmware update (S450). On the contrary, when the locality does not exist (S430—N), since update should be performed in units of bits, the microcontroller 100 performs the above-described incremental firmware update (S440).

Figure 16:
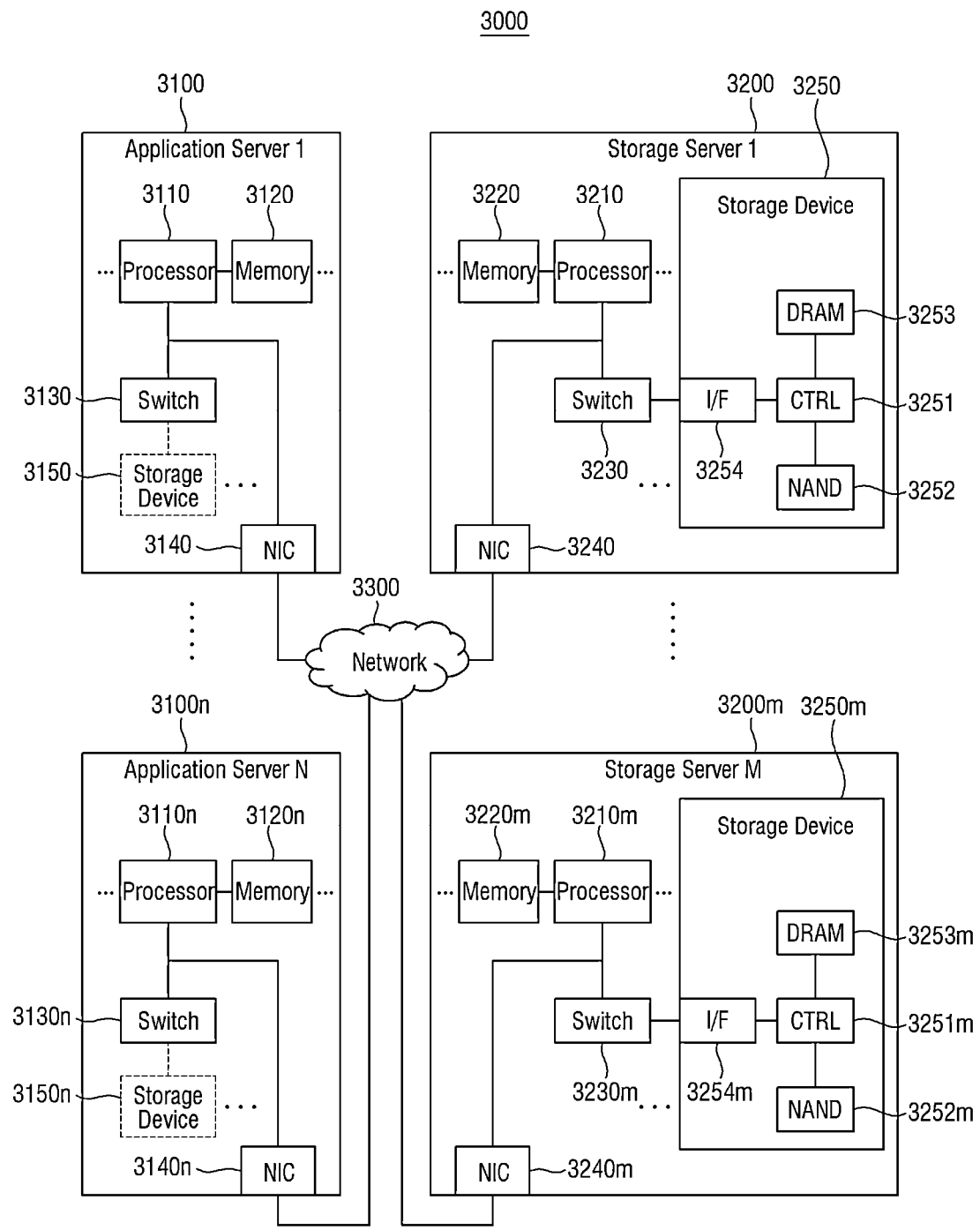
FIG. 16 is a view illustrating a data center that includes a storage device according to some example embodiments.

FIG. 16 is a view illustrating a data center that includes a storage device according to some example embodiments.

Referring to FIG. 16, a data center 3000 is a facility that collects various data and provides a service, and may be referred to as a data storage center. The data center 3000 may be a system for operating a search engine and a database, and may be a computing system used in an enterprise such as a bank or a government agency.

The data center 3000 may include application servers 3100 to 3100n and storage servers 3200 to 3200m. The number of application servers 3100 to 3100n and the number of storage servers 3200 to 3200m may be variously selected in accordance with example embodiments, and the number of application servers 3100 to 3100n and the number of storage servers 3200 to 3200m may be different from each other.

The application server 3100 or the storage server 3200 may include at least one of the processors 3110 and 3210 or the memories 3120 and 3220. The storage server 3200 will be described by way of example. The processor 3210 may control the overall operation of the storage server 3200, and may access the memory 3220 to execute command languages and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or a Non-Volatile DIMM (NVMDIMM). In accordance with the example embodiment, the number of processors 3210 and the number of memories 3220, which are included in the storage server 3200, may be variously selected.

In one example embodiment, the processor 3210 and the memory 3220 may provide a processor-memory pair. In one example embodiment, the number of processors 3210 and the number of memories 3220 may be different from each other. The processor 3210 may include a single core processor or a multi-core processor.

The aforementioned processor (22 of FIG. 1) may correspond to, for example, the processor 3210. The aforementioned BMC (24 of FIG. 1) may be disposed in the storage server 3200 to manage the configuration of the storage server 3200 independently of the processor 3210.

The description of the storage server 3200 may be similarly applied to the application server 3100. In accordance with the example embodiment, the application server 3100 may not include the storage device 3150. The storage server 3200 may include at least one storage device 3250. The number of storage devices 3250 included in the storage server 3200 may be variously selected depending on the example embodiments.

In some example embodiments, the storage device 3250 may include the storage device 10 shown in FIG. 1. That is, the storage device 3250 may perform in-band communication and out-of-band communication with the storage server 3200.

The application servers 3100 to 3100n and the storage servers 3200 to 3200m may perform communication with each other through a network 3300. The network 3300 may be implemented using a Fiber Channel (FC) or Ethernet. In this case, the FC is a medium used for relatively high-speed data transmission, and may use an optical switch that provides high performance/high availability. In accordance with an access scheme of the network 3300, the storage servers 3200 to 3200m may be provided as file storages, block storages, or object storages.

In one example embodiment, the network 3300 may be a storage-only network such as a storage area network (SAN). For example, the SAN may be an FC-SAN that uses an FC network and is implemented in accordance with an FC protocol (FCP). For another example, the SAN may be an IP-SAN that uses a TCP/IP network and is implemented in accordance with an SCSI over TCP/IP or Internet SCSI (iSCSI) protocol. In another example embodiment, the network 3300 may be a general network such as a TCP/IP network. For example, the network 3300 may be implemented in accordance with protocols such as FC over Ethernet (FCoE), Network Attached Storage (NAS) and NVMe over Fabrics (NVMe-oF).

Hereinafter, the description will be based on the application server 3100 and the storage server 3200. The description of the application server 3100 may be applied to another application server 3100n, and the description of the storage server 3200 may be applied to another storage server 3200m.

The application server 3100 may store data requested by a user or a client in one of the storage servers 3200 to 3200m through the network 3300. Also, the application server 3100 may acquire the data requested by the user or the client from one of the storage servers 3200 to 3200m through the network 3300. For example, the application server 3100 may be implemented as a web server or a database management system (DBMS).

The application server 3100 may access the memory 3120n or the storage device 3150n, which is included in another application server 3100n, through the network 3300. Alternatively, the application server 3100 may access the memories 3220 to 3220m or the storage devices 3250 to 3250m, which are included in the storage servers 3200 to 3200m, through the network 3300. Therefore, the first application server 3100 may perform various operations for the data stored in the application servers 3100 to 3100n and/or the storage servers 3200 to 3200m. For example, the application server 3100 may execute command languages for moving or copying data between the application servers 3100 to 3100n and/or the storage servers 3200 to 3200m. In this case, the data may be moved from the storage devices 3250 to 3250m of the storage servers 3200 to 3200m to the memories 3220 to 3220m of the storage servers 3200 to 3200m, or may be directly moved to the memories 3120 to 3120n of the application servers 3100 to 3100n. The data moved through the network 3300 may be data encrypted for security or privacy.

The storage server 3200 will be described by way of example. The interface 3254 may provide physical connection of the processor 3210 and the controller 3251 and physical connection of the Network InterConnect (NIC) 3240 and the controller 3251. For example, the interface 3254 may be implemented in a Direct Attached Storage (DAS) scheme that directly connects the storage device 3250 to a dedicated cable. Also, for example, the interface 3254 may be implemented in a variety of interface ways such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), Secure Digital (SD) card, Multi-Media Card (MMC), embedded multi-media card (eMMC), Universal Flash Storage (UFS), embedded Universal Flash Storage (eUFS), and/or Compact Flash (CF) card interface.

The storage server 3200 may further include a switch 3230 and an NIC 3240. The switch 3230 may selectively connect the processor 3210 with the storage device 3250 in accordance with the control of the processor 3210, or may selectively connect the NIC 3240 with the storage device 3250.

In one example embodiment, the NIC 3240 may include a network interface card, a network adapter, and the like. The NIC 3240 may be connected to the network 3300 by a wired interface, a wireless interface, a Bluetooth interface, an optical interface, and the like. The NIC 3240 may include an internal memory, a Digital Signal Processor (DSP), a host bus interface, and the like, and may be connected to the processor 3210 and/or the switch 3230 through the host bus interface. The host bus interface may be implemented as one of the above-described examples of the interface 3254. In one example embodiment, the NIC 3240 may be integrated with at least one of the processor 3210, the switch 3230 or the storage device 3250.

In the storage servers 3200 to 3200m or the application servers 3100 to 3100n, the processor may transmit a command to the storage devices 3150 to 3150n and 3250 to 3250m or the memories 3120 to 3120n and 3220 to 3220m to program or read data. At this time, the data may be error-corrected data through the ECC engine. The data may be Data Bus Inversion (DBI) or Data Masking (DM) processed data, and may include Cyclic Redundancy Code (CRC) information. The data may be data encrypted for security or privacy.

The storage devices 3150 to 3150n and 3250 to 3250m may transmit a control signal and a command/address signal to the NAND flash memory devices 3252 to 3252m in response to a read command received from the processor. Therefore, when reading data from the NAND flash memory devices 3252 to 3252m, a Read Enable (RE) signal may be input as a data output control signal to output the data to a DQ bus. A data strobe DQS may be generated using the RE signal. The command and the address signal may be latched into a page buffer in accordance with a rising edge or a falling edge of a write enable (WE) signal.

The controller 3251 may generally control the operation of the storage device 3250. In one example embodiment, the controller 3251 may include a Static Random Access Memory (SRAM). The controller 3251 may write data in the NAND flash 3252 in response to a write command, or read data from the NAND flash 3252 in response to a read command. For example, the write command and/or the read command may be provided from the processor 3210 in the storage server 3200, the processor 3210m in another storage server 3200m or the processors 3110 and 3110n in the application servers 3100 and 3100n. The DRAM 3253 may temporarily store (buffer) data to be written in the NAND flash 3252 or data read from the NAND flash 3252. Also, the DRAM 3253 may store metadata. In this case, the metadata is user data or data generated by the controller 3251 to manage the NAND flash 3252. The storage device 3250 may include a Secure Element (SE) for security or privacy. In some example embodiments, the controller 3251 may correspond to the storage controller (200 of FIG. 1) described above, and the microcontroller (100 of FIG. 1) may be disposed in the storage device 3250 to perform out-of-band communication with the BMC (24 of FIG. 1) in the storage server 3200.

Although the example embodiments of the present disclosure have been described with reference to the accompanying drawings, it will be apparent to those skilled in the art that the present disclosure can be fabricated in various forms without being limited to the above-described example embodiments and can be embodied in other specific forms without departing from technical spirits and essential characteristics of the present disclosure. Thus, the above example embodiments are to be considered in all respects as illustrative and not restrictive.

Example embodiments have been described above with the aid of method steps illustrating the performance of specified functions and relationships thereof. The boundaries and sequence of these functional building blocks and method steps have been defined herein for convenience of description. Alternate boundaries and sequences can be defined, so long as the specified functions and relationships are appropriately performed. Any such alternate boundaries or sequences are thus within the scope and spirit of the claims.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination of two or more of A, B, and C. Likewise, A and/or B means A, B, or A and B.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

What is claimed is:

1. A storage device comprising:
a first non-volatile memory;
a storage controller configured to receive a memory command for writing data in the first non-volatile memory or reading the data from the first non-volatile memory from a processor of a host device through a first channel;
a microcontroller configured to receive a command related to a firmware update executed in the storage device from a baseboard management controller (BMC) of the host device through a second channel different from the first channel; and
a second non-volatile memory configured to receive and store firmware data from the BMC of the host device.

2. The storage device of claim 1, wherein the first channel includes an in-band channel, and the second channel includes an out-of-band channel.

3. The storage device of claim 1, wherein the first channel and the second channel are configured to use different communication protocols.

4. The storage device of claim 3, wherein the first channel is configured to use a protocol selected from a first group of protocols consisting of a Universal Flash Storage (UFS) protocol, an embedded Multi-Media Card (eMMC) protocol, and a Non-Volatile Memory express (NVMe) protocol, and the second channel is configured to use at least one of an Inter Integrated Circuit (I2C) protocol or a System Management Bus (SMBus) protocol.

5. The storage device of claim 1, wherein the microcontroller includes a controller configured to communicate with the BMC through the second channel, a buffer memory, and the second non-volatile memory.

6. The storage device of claim 5, wherein the first non-volatile memory includes a NAND flash memory, and the second non-volatile memory includes a ferroelectric random access memory (FRAM).

7. The storage device of claim 5, wherein the command related to the firmware update includes a firmware download command and a firmware commit command, and wherein the microcontroller is configured to assign a firmware slot to the second non-volatile memory and store at least a portion of the firmware data received from the BMC in the buffer memory in response to receiving the firmware download command through the second channel, and store the at least a portion of the firmware data stored in the buffer memory in the firmware slot of the second non-volatile memory in response to receiving the firmware commit command through the second channel.

8. The storage device of claim 7, wherein the microcontroller stores the entire firmware data received from the BMC in the buffer memory in response to receiving the firmware download command through the second channel.

9. The storage device of claim 7, wherein the microcontroller updates first firmware data stored in the second non-volatile memory in units of bits based on the firmware data received from the BMC, and stores the first firmware data in the buffer memory in response to receiving the firmware download command through the second channel.

10. The storage device of claim 7, wherein the microcontroller changes a portion of first firmware data stored in the second non-volatile memory corresponding to the at least a portion of the firmware data received from the BMC and stores the firmware data, including the portion changed, in the buffer memory in response to receiving the firmware download command through the second channel.

11. The storage device of claim 1, wherein the second non-volatile memory stores Vital Product Data (VPD) for the storage device, and the microcontroller provides the VPD to the host device.

12. The storage device of claim 1, further comprising a sensor sensing a state of the storage device, wherein the microcontroller transmits information sensed by the sensor to the BMC.

13. The storage device of claim 12, wherein the sensor includes a voltage sensor sensing a voltage of the first non-volatile memory, an external voltage sensor sensing a voltage provided from outside of the storage device, a temperature sensor sensing a temperature of the storage device and a humidity sensor sensing humidity around the storage device.

14. A host device comprising:

a processor configured to transmit a memory command, for writing data in a non-volatile memory or reading the data from the non-volatile memory, through a first channel to a storage controller of a storage device including the non-volatile memory; and a BMC configured to transmit a command to a microcontroller of the storage device, wherein the command is related to a firmware update executed in the storage device, through a second channel different from the first channel.

15. The host device of claim 14, further comprising a power supply unit configured to provide a first voltage to the processor via a first power rail, provide a second voltage to the BMC via a second power rail different from the first power rail, and provide the second voltage to the microcontroller of the storage device.

16. The host device of claim 15, wherein a first magnitude of the first voltage is greater than a second magnitude of the second voltage.

17. The host device of claim 14, wherein the BMC is configured to transmit the command related to the firmware update to the microcontroller through the second channel during a time the processor is transmitting the memory command to the storage controller through the first channel.

18. The host device of claim 14, wherein the BMC is configured to transmit the command related to firmware update to the microcontroller through the second channel during a time the storage controller is in a power-off state, wherein during the power-off state, the processor is not transmitting the memory command to the storage controller through the first channel.

19. A storage device comprising:

a first non-volatile memory;

a storage controller configured to receive a memory command for writing data in the first non-volatile memory or reading the data from the first non-volatile memory from a processor of a host device through a first channel; and a microcontroller configured to receive a command related to a firmware update executed in the storage device from a BMC of the host device through a second channel different from the first channel, wherein the microcontroller receives the command related to the firmware update through the second channel during a time the storage controller is receiving the memory command from the processor of the host device through the first channel.

20. The storage device of claim 19, wherein the microcontroller receives a voltage from a voltage supply unit supplying the voltage to the BMC of the host device.

* * * * *